May 20, 1958             T. FRAYER             2,835,352
PRESSURE SENSING AUTOMATIC CLEARANCE ADJUSTOR
Filed Nov. 28, 1955
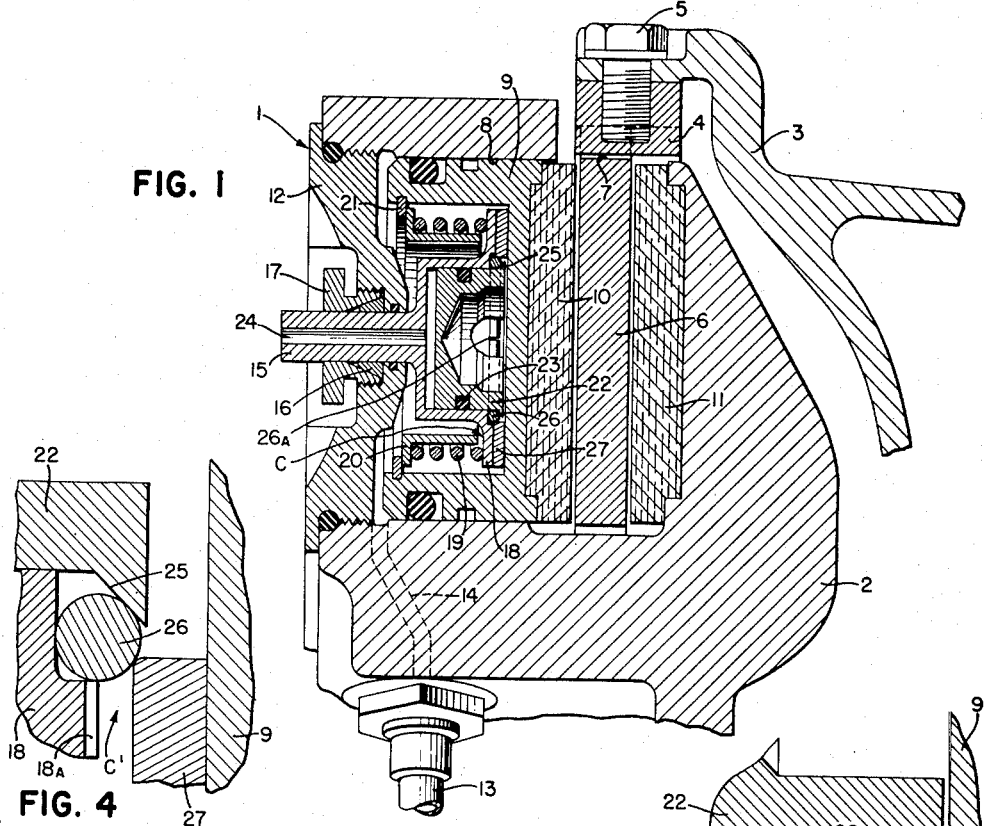
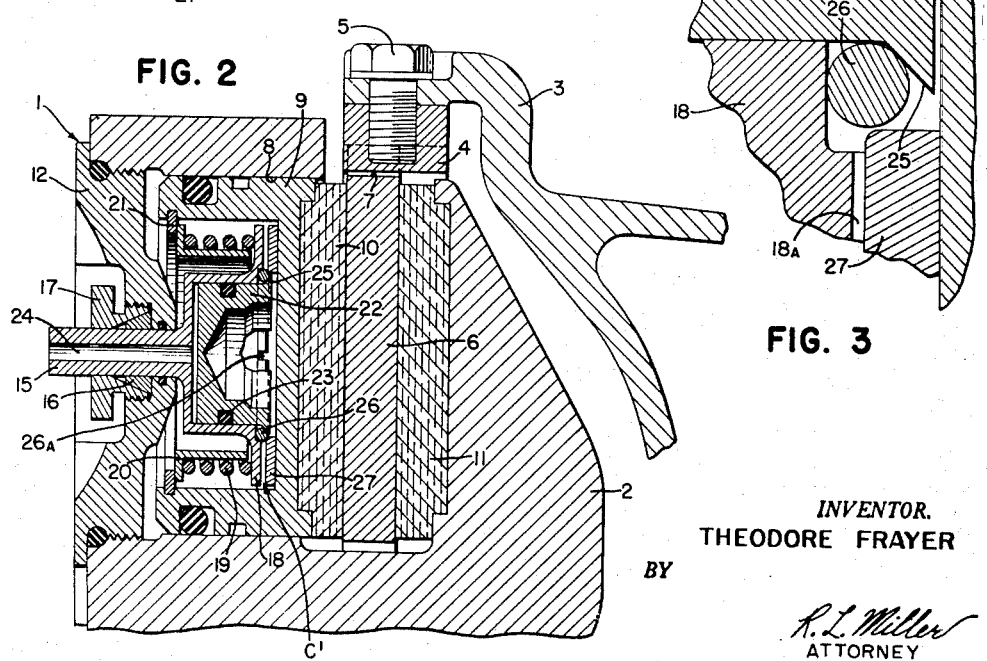
INVENTOR.
THEODORE FRAYER
BY
R. L. Miller
ATTORNEY United States Patent Office 2,835,352
Patented May 20, 1958

2,835,352

PRESSURE SENSING AUTOMATIC CLEARANCE ADJUSTOR

Theodore Frayer, Canton, Ohio, assignor to The Goodyear Tire & Rubber Company, Akron, Ohio, a corporation of Ohio Application November 28, 1955, Serial No. 549,529

4 Claims. (Cl. 188—73)

This invention relates to brakes, and especially to so called "spot" type of brakes such as are used in aircraft wheels, and other places.

In various types of brakes, especially aircraft brakes, there has been widespread use of so called automatic adjustment pins as shown in U. S. Patent No. 2,392,970 wherein the automatic adjustment pin permits variation in the released, i. e. inoperative position of a brake, as wear occurs on the brake linings in a brake structure. However, in producing braking action, there are relatively large pressures built up in the brake assembly, including the brake housing and other supporting means. Such pressures cause a springing apart of the brake housing, for example, so that when the brake is released even with the normal turn or release mechanism operating satisfactorily, a drag may remain upon the brakes. This is because the automatic adjustment pin may not adequately compensate for the springing movement of the brake housing or other components.

It is the general object of the present invention to provide a new and improved type of a brake structure characterized by the complete release of all forces built up in the brake during brake actuation upon brake release.

Another object of the invention is to provide a novel control for a brake utilizing a pair of concentric, oppositely moving pistons in a brake for controlling the operating and release positions of the brake means.

Another object of the invention is to provide an auxiliary piston within a brake piston, and to control the position of such auxiliary piston by a novel split ring provided in the brake so that energy can be stored in the split ring for moving the brake piston to a clearance position.

Yet another object of the invention is to provide an uncomplicated but positive acting member for facilitating effective and complete release of brakes, which member is adapted to function only after the springing movement of brake components has been removed upon brake release.

Yet another object of the invention is to provide an automatic adjustment type of a brake with means for moving the automatic adjustment grip to take care of all brake housing deflections upon braking action and release thereof.

The foregoing and other objects and advantages of the invention will be made more apparent as the specification proceeds.

For a better understanding of the invention, attention is directed to the accompanying drawings which illustrate one currently preferred embodiment of the invention and wherein:

Fig. 1 is a fragmentary vertical section through a brake of the invention showing the brake in its released, inoperative position, part of the auxiliary piston being broken away to show the restricted passage in the resilient ring;

Fig. 2 is a section similar to Fig. 1 of the brake shown in its operative, braking position;

Fig. 3 is an enlarged, fragmentary section showing the control ring and associated parts and indicating the parts in "brake-off" position; and Fig. 4 is a view similar to Fig. 3 but showing the parts in "brake-on" position with normal brake clearance C exceeded.

When referring to corresponding parts shown in the drawings and referred to in the specification, corresponding numerals are used to facilitate comparison between such parts.

Reference now should be had to the details of the construction shown in the accompanying drawings, and a brake is indicated as a whole by the numeral 1. This brake includes a conventional brake housing 2, usually fixed to the axle (not shown), and a wheel 3 (journalled on the axle) is shown in operative association with the brake housing 2. Such wheel 3 has a plurality of keys 4 secured thereto, as by cap screws 5, so that the wheel 3 will be operatively engaged with a brake disc 6 by the keys 4 engaging slots 7 provided in the periphery of the brake disc. In the structure described, the brake disc can be moved axially of the wheel 3, as is conventional in many brake structures, when braking action occurs.

The brake housing 2, sometimes described as of C-shape to surround the disc 6, has a brake cylinder 8 provided therein in which a brake piston 9 is operatively received. The brake piston 9 has a round block or "spot" of brake lining 10 suitably secured thereto and movable therewith while a similar brake lining block or member 11 is fixed to the brake housing 2 on the opposite side of the brake disc 6 from the brake lining 10 so that movement of the brake piston 9 towards the brake disc 6 will squeeze the axially movable disc between blocks 10 and 11 to provide effective braking action on leaving all other portions of the disc 6 not engaged by the blocks free for cooling, all in accord with characteristic "spot" brake action. The outer end of the brake cylinder 8 is closed, as by an end cap 12, and hydraulic fluid under pressure is supplied to the brake cylinder 8 by a brake conduit 13 which connects to a suitable source of brake pressure fluid, such as the master cylinder of a brake system (not shown). This conduit 13 connects to a bore 14, provided in the brake housing 2 that extends to the brake cylinder 8 for flow of hydraulic pressure fluid thereto for brake actuation.

The brake 1 of the invention is provided with a brake lining wear compensator, i. e., an automatic adjustment pin 15 which extends through the end cap 12 and has suitable friction means 16 compressed into engagement therewith, as by a lock nut 17 which engages the end cap 12.

As an important feature of the invention, the inner end, or head 18 of the automatic adjustment pin 15 is made of enlarged cup shape and a return spring 19 is compressed between this automatic adjustment pin head 18 and a washer or pressure member 20 seated on a split ring 21 carried by the brake piston 9 on the inner surface thereof. Hence when the brake is released, this return spring 19 is used to move the brake piston 9 back to inoperative position, as hereinafter explained in more detail. It can be said that thus a lost motion connection is provided between piston 9 and pin 15 in the amount of clearance C as hereinafter detailed.

A further very important feature of the present invention relates to an auxiliary piston 22 operatively received within the cup-shaped head 18 of the automatic adjustment pin. A conventional O-ring 23 seals the piston in such head 18. In order to prevent suction or vacuum forces from being created within the head 18, inasmuch as the auxiliary piston 22 provides a closed outer end for such cup shaped head and the piston 22 is adapted to move oppositely to the brake piston 9, an air vent or a bore 24 is provided in the automatic adjustment pin 15 and continuously vents the space between the auxiliary piston 22 and the head 18 to the atmosphere. The auxiliary piston 22 has an outwardly extending tapered, or conically shaped lip or flange 25 and a radially split resilient metal ring 26, of annular shape in section and having its ends defining a restricted fluid passage or gap 26a therebetween, is normally snugly received upon the cylindrical portion of the auxiliary piston 22 at the base of the tapered flange 25 for action as hereinafter described in more detail. An open-centered back-up plate or washer 27 is received within the piston 9 and is immediately adjacent the tapered flange, as best seen in Fig. 3, but functions as a unit with the piston 9. Radially extending recesses 18a (shown only on enlarged Figs. 3 and 4) are provided in the axially inner surface of the head 18 to permit ready passage of brake pressure fluid to the auxiliary piston 22.

In operaiton, the normal released inoperative position of the brake components is shown in Fig. 1. In such position, the head 18 of the automatic adjustment pin 15 is tightly held against the washer 27 and the washer is held against the piston 9 by the return spring 19. The ring 26 is in its normal position at the base of the tapered flange 25, as shown in Fig. 3, and there is a clearance C. The clearance C insures sufficient spacing between the disc 6 and brake blocks 10 and 11 so that there is no drag on free rotation of wheel 3 when the brake is in released, i. e., off position.

When the brake is applied, fluid under braking pressure is supplied by conduit 13 and bore 14 to cylinder 8 to move piston 9 towards brake disc 6 to effect braking action. Sometimes this braking action can be effected within the limits of clearance C. When this is the case, spring ring 26 is never moved to wedging, i. e., filler position of Fig. 4 as hereinafter described.

However, in a very severe or "panic" stop, with the pilot hitting the brake pedal with all his strength, or in operations with power brakes, it is possible to "spring" or resiliently distort the brake housing 2 under braking load. For example, the leg of the housing carrying brake block 11 may bend resiliently. Again, the disc 6 may have become warped or dished in use so that before full braking load can be applied thereto, it must be flattened by movement of blocks 10 and 11 against it. Or still again, the blocks 10 and 11 may have worn away so that farther movement of piston 9 in braking direction is required.

Thus, in some applications of the brake, the clearance C is used up before the brake is fully set. Continued movement of piston 9 toward braking position then causes pressure member 20 to engage head 18 with automatic adjustment pin 15 being pulled through friction grip 16 to a new axial position. This periodic reposition of pin 15 as lining wear occurs is the automatic adjustment of Patent No. 2,392,970 and insures no loss of pedal pressure or stroke over the life of the brake lining.

However, when housing and disc springing or distortion come into the picture and are not compensated for, the repositioning of pin 15 as described may result in holding blocks 10 and 11 partially or tightly against disc 6 to give a brake drag on the wheel 3 even when the brake pressure is fully released.

The essence of the present invention is the provision of automatic mechanism, as previously described structurally, for taking care of housing, disc or any other springing or distortion without upsetting the automatic adjustment due to lining wear.

The desired function is achieved with the apparatus already described as follows: When clearance C (of the lost motion connection between pin 15 and piston 9) disappears on a brake application to bring pressure member 20 into engagement with head 18, exactly the same clearance, but this time marked clearance $C^1$, appears between washer 27 and head 18 (see Fig. 4). Simultaneously, the hydraulic fluid under braking pressure applies itself to auxiliary piston 22 which moves inwardly in head 18 to press spring ring 26 by tapered flange 25 down into the position shown in Fig. 4 between washer 27 and head 18. The ring 26 is maintained in this position as long as there is pressure on piston 22. In this position, the pin 15 and piston 9 are effectively locked together.

To hold the ring 26 in the position of Fig. 4 is important and why this is important can best be described by considering an exaggerated condition which is never experienced in practice, but which will now be discussed to exemplify the operation. Assume clearance C has disappeared as described, and that clearance $C^1$ has appeared and ring 26 has been moved into the position of Fig. 4. Assume further that before full braking pressure is applied, housing 2 springs apart (within its elastic limit) one-half inch. During this final one-half inch of movement, the pin 15 is pulled through friction grip 16, a distance of one-half inch.

Now brake pressure is released. However, pressure on piston 22, and likewise on piston 9, does not instantly drop to brake line pressure because the deflective spring in the brake housing and other parts is applying a very considerable force on piston 9 (attempting to return it one-half inch). There is a relatively tortuous, small path for fluid to escape from behind piston 22 (only through the radial split in the ring 26—see Fig. 4), and even the conventional bore 14 and conduit 13 providing fluid to piston 9 are small.

The result is that the piston 22 and ring 26 stay in the position of Fig. 4 upon brake release with the deflective spring in the brake housing and other parts pushing on piston 9, through washer 27, ring 26 and head 18 to push pin 15 back through friction grip 16 substantially the full one-half inch of exaggerating housing deflection described above. The pressure behind auxiliary piston 22 then drops to line pressure whereupon spring ring 26 acting on tapered flange 25 moves piston 22 outwardly in head 18 allowing ring 26 to move from between washer 27 and head 18. Thereupon, spring 19 moves piston 9 away from disc 6 to re-establish brake clearance and eliminate drag. During this movement clearance $C^1$ disappears to return the parts to the position of Fig. 3, and clearance C re-appears between pressure member 20 and head 18 to return all of the parts to the brake-off position of Fig. 1.

From the foregoing, it will be recognized that an automatic apparatus has been provided including mechanism compensating for brake lining wear and mechanism compensating for brake housing deflection or other springing. The mechanism cooperate with each other so that regardless of deflections of brake parts or lining wear, a constant and drag-free brake clearance is obtained upon brake release over the lining life of the brake.

While certain representative embodiments and details have been shown for the purpose of illustrating the invention, it will be apparent to those skilled in this art that various changes and modifications may be made therein without departing from the spirit or scope of the invention.

What is claimed is:

1. In a brake, a brake housing having a brake cylinder therein, a brake piston received in said brake cylinder, pressure fluid being receivable in said brake cylinder for brake action, an automatic adjustment pin having a cup-shaped head thereon, a lost motion connection between the pin and piston, resilient means holding the piston toward the pin, an auxiliary piston received within and closing the open end of the head of said automatic adjustment pin but extending slightly therefrom, said auxiliary piston having a tapered edge flange thereon, and a split resilient ring intermediate said edge flange and said head, said auxiliary piston being forced into said head and expanding said ring by such movement when sufficient pressure is exerted on said auxiliary piston by pressure fluid in said brake cylinder on brake action, said ring when expanded having bearing contact between and spacing said adjustment pin and said brake piston to transmit any deflection forces applied to said brake piston to said adjustment pin, said ring upon brake release contracting to permit bearing contact between said brake piston and the head on said adjustment pin.

2. In combination in a brake, a housing, a wheel mounted for rotary movement adjacent the housing, a brake disc splined to the wheel and movable through a slot in the housing, a block of brake lining carried by the housing at one side of the slot, a piston slidably received in a cylinder in the housing for movement toward the side of the disc opposite to the area of said block, a second block of brake lining carried by the piston, hydraulic means for moving the piston, a lining wear compensator pin, means on the housing for frictionally gripping the pin and holding it extending into the cylinder, resilient means for holding the piston against the pin, clearance establishing means between the piston and pin and adapted to engage upon selected braking movement of the piston against the resilient means, an auxiliary piston carried between the piston and pin, and operated by the fluid pressure behind the piston, wedging means operated by the auxiliary piston for filling the clearance between the piston and pin when the clearance between the clearance establishing means disappears on brake application, said wedging means comprising a split ring having abutting ends defining therebetween a restricted passage for fluid in its clearance filling position being resilient and inherently movable to non-wedging position upon release of pressure to the auxiliary piston.

3. In a spot-type brake, a brake disc, a C-shaped housing surrounding the disc, a piston slidably received in a cylinder-like opening in one leg of the housing for movement toward the disc, a block of brake lining on the piston to engage one side of the disc, a block of brake lining on the other leg of the housing to engage the other side of the disc, a pin frictionally gripped by the housing and extending into the opening, a lost-motion connection between the pin and piston, resilient means for holding the piston against the pin, hydraulic supply means for moving the piston toward the disc within the limits of the lost motion connection without moving the pin and for then pulling the pin relative to the housing when the lost motion connection limits are exceeded, and means positioned between the piston and pin, and responsive to hydraulic pressure on the piston, for locking the piston and pin together when the limits of the lost motion connection are exceeded, said last-named means comprising a resilient split ring movable into a clearance position between the piston and the pin in "brake-on" position, and an auxiliary piston movable under hydraulic pressure to advance the ring into the clearance position, a gap in said ring defining a restricted passage from said auxiliary piston for escape of hydraulic fluid to relieve pressure on said piston.

4. A brake including a movable member, a block of friction material, means for moving the block into engagement with the member, a pin, stationary means for frictionally gripping the pin and holding it in alignment with the movement of the block moving means, a lost motion connection between the pin and block, resilient means holding the block towards the pin, and means for locking the block and pin together when the limits of the lost motion connection are exceeded, said locking means comprising a split resilient ring expandable into a clearance space between the block and the pin when limits of lost motion are exceeded, hydraulic operated means for expanding said ring, the split in said ring defining a restricted passage for escape of pressure fluid to delay return of said ring when fluid pressure is released.

References Cited in the file of this patent
UNITED STATES PATENTS

| | | |
|---|---|---|
| 2,531,341 | Meador | Nov. 21, 1950 |
| 2,790,515 | Hawley | Apr. 30, 1957 |

FOREIGN PATENTS

| | | |
|---|---|---|
| 717,350 | Great Britain | Oct. 27, 1954 |